ABSTRACT OF THE DISCLOSURE

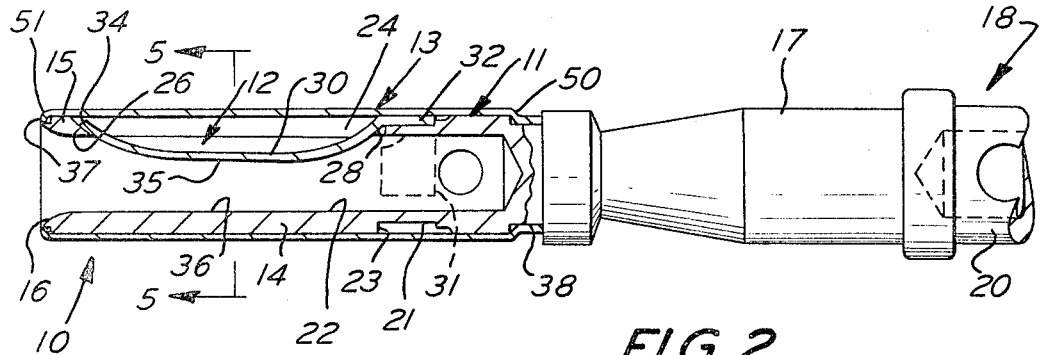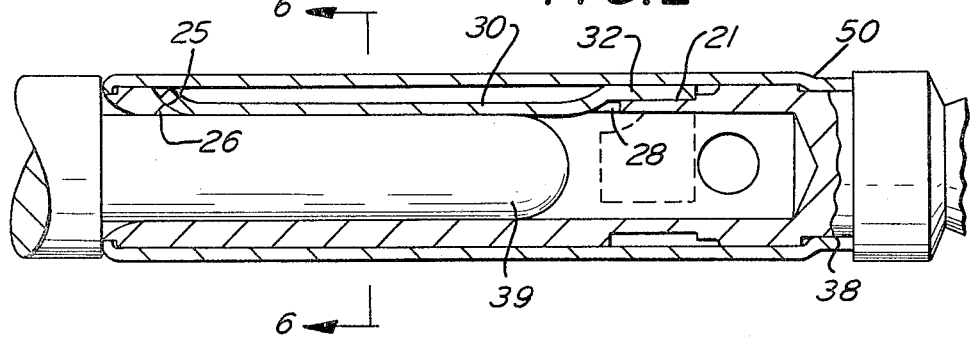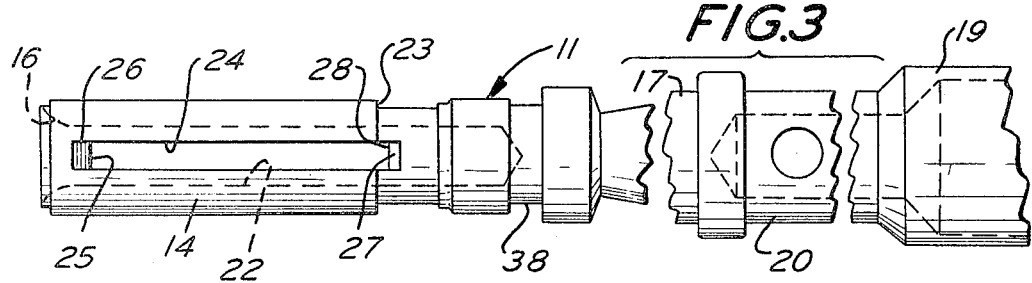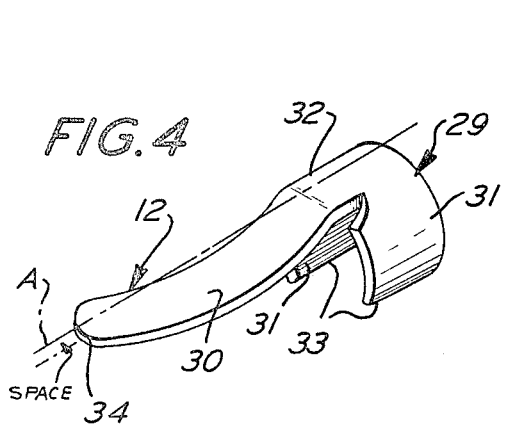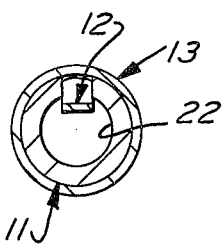
INVENTORS
ARTHUR MILANESE &
ALBERT PONS
BY
Donald M. Sandler
ATTORNEY > # United States Patent Office > 3,383,645
> FEMALE SOCKET CONTACT HAVING A SPRING-CLIP
> Arthur Milanese and Albert Pons, Philadelphia, Pa., assignors to Elco Corporation, Willow Grove, Pa., a corporation of Delaware
> Filed Apr. 4, 1967, Ser. No. 628,469
> 6 Claims. (Cl. 339—217)

A closed entry female socket contact designed to mate with a cylindrical pin inserted into an axial bore in the cylindrical body of the contact, utilizes a cambered leg of a spring-clip projecting through an axial slot in the body to resiliently retain the pin in the bore. Joined to one end of the leg is a pair of resilient fingers that wrap around the body of the contact and seat in a circumferential groove for the purpose of retaining the leg in the slot during the final assembly operation which involves sliding a tubular sleeve over the sub-assembly of the body and spring-clip. Such assembly is facilitated because both the fingers and the free end of the leg are entirely contained within the projected area of the body and do not interfere with the tubular sleeve.

---

This invention relates to a closed-entry female socket contact of the type having a sleeve which encloses the cylindrical body of the contact and properly positions and holds a cambered spring-leg projecting into the axial bore of the body so that a pin inserted therein will be resiliently engaged and retained by the spring-leg. When the sleeve is to be tubular and crimped onto the body, the sub-assembly of the body and the spring must first be slideably inserted into the sleeve. Unless the spring is securely attached to the body and does not interfere with relative movement of the sleeve onto the body, it is difficult to utilize automatic equipment to assemble contacts of this type, and it is this difficulty that the present invention alleviates.

Briefly, the invention includes a unitary spring-clip having a pair of resilient fingers to which one end of a cambered spring leg is joined. The fingers are curved to fit in a circumferential groove in the body and extend more than 180° around the circumference permitting the fingers to be snapped into the groove thus securely retaining the clip to the body and facilitating handling of the sub-assembly. The junction of the cambered leg of the fingers as well as the leg itself extend into an axially extending slot in the cylindrical body that connects to the axial bore in the body, with the result that the cambered leg is entirely contained within the periphery of the body. The end of the slot terminates short of the entrance to the contact in a tapered web on which the free end of the camber leg rests thus pre-loading the leg and avoiding the possibility that insertion of the pin into the bore will snag the free end of the leg. The tapered web also provides clearance for accommodating deflection of the free end of the leg so that the cylindrical periphery of the body is clear of all obstruction to free sliding movement of the sleeve when the latter is assembled onto the body.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

The invention can be understood by making reference to the following detailed description and the accompanying drawings wherein:

FIG. 1 is a longitudinal sectional view of an electrical socket contact into which the present invention is incorporated;

FIG. 2 is similar to FIG. 1 except that a mating pin is shown inserted into the socket;

FIG. 3 is a top view of the contact body with the spring and sleeve removed;

FIG. 4 is a perspective view of the spring used in the present invention;

FIG. 5 is a transverse cross-section taken along the lines 5—5 in FIG. 1;

FIG. 6 is a transverse cross-section taken along the lines 6—6 in FIG. 2.

Referring now to FIG. 1, reference numeral 10 designates an electrical socket contact made in accordance with the present invention. Contact 10 comprises contact body 11, unitary spring clip 12 and sleeve 13. Body 11 preferably is leaded commercial bronze and has cylindrical portion 14 at one end 15 that terminates in free axial end 16, while the other end 17 of body 11 is provided with lead connection means 18. Enlarged ferrule 19 at the axial end of body 11 opposite to axial end 16 is large enough in diameter to accept an insulated conductor (not shown) while barrel 20 between ferrule 19 and portion 14 will accept only the conductor itself. A conventional crimping operation electrically and mechanically connects an insulated conductor (not shown) to end 17 of body 11.

Remote from axial end 16 of body 11 is circumferential groove 21 in portion 14 which has therein, a uniform diameter axial bore 22 that opens at axial end 16 and extends to at least the forward end 23 of groove 21, and preferably deeper into portion 14. Axial slot 24 in portion 14 is located between the free end 16 and groove 21 and terminates at end 25 short of free end 16 to define web 26 whose thickness gradually decreases measured in a direction toward groove 21 for a purpose to be explained. The slot 24 is preferably milled and the tapered web is the result of using a milling cutter in a known manner. The other end 27 of slot within groove 21 to define notch 28. The wall thickness at the closed end of notch 28 gradually decreases measured in a direction toward free end 16 for a purpose to be explained.

Unitary spring clip 12 shown in FIG. 4 is formed from a T-shaped blank of resilient metal such as quarter-hard beryllium copper and comprises a support base 29 and a cantilever leg 30. Base 29 is in the form of a pair of curved fingers 31 matching the curvature of groove 21 in portion 14 with leg 30 being located centrally between fingers 31 at junction 32. The free ends 33 of fingers 31 do not meet and are preferably spaced about 120° apart thus permitting the fingers to be snapped into groove 21 when leg 30 is aligned with slot 24. In such case, junction 32 seats in notch 28, and leg 30 lies within slot 24, the free end 34 of leg 30 resting on the edge of web 26 remote from free end 16 of portion 14. This pre-loads leg 30 because, in its unflexed position prior to when the clip is placed on body 11, the free end 34 of the leg lies below the cylindrical projection of finger 31 as suggested by the phantom line A in FIG. 4. The mid portion 35 of leg 30 is curved so as to project into bore 22 toward the axis thereof but the camber of leg 30 in its pre-load condition is such that the mid portion 35 is spaced from the surface 36 defining bore 22 a distance slightly greater than half the diameter of the bore.

The thickness of the blank from which spring clip 12 is formed is related to the depth of groove 21 and the taper of web 26 upon which free end 34 of the leg rests. In particular the thickness of fingers 31 is no greater than the depth of the groove so that both the fingers and junction 32 between the fingers and leg 30 will lie within the periphery of portion 14 as shown in FIG. 1. Free end 34 of leg 30 will likewise not project above the periphery of portion 14 if the taper of web 26 is proper. For this reason, no portion of spring 12 interferes with assembling tubular sleeve 13 over portion 14.

Sleeve 13 is preferably of Monel metal and is tubular with a uniform wall thickness. One end 50 of the sleeve is open and the other end 51 is provided with an inturned flange 37 that abuts and overlies the free axial end 16 of portion 14 when open end 50 is slideably inserted onto end 16. End 50 is then crimped into groove 38 in body 14 to securely retain spring 12 in groove 21. Prior to assembly of sleeve 13, however, spring 12 is retained on portion 14 because fingers 31 extends more than halfway around groove 21. This construction facilitates handling of the sub-assembly of the body 11 and clip 12 during manufacture of a complete socket contact.

In use, a pin 39 of a diameter slightly less than the diameter of axial bore 22 is inserted into the bore as shown in FIG. 2. The rounded nose of pin 39 will engage portion 35 of leg 30 resiliently deflecting it away from the axis of the bore thus exerting a radial force on the pin urging it against surface 36 of the bore. As a consequence of this, frictional forces are created that resist withdrawal of the pin from the bore.

What is claimed is:

1. An electrical socket contact for use with a longitudinally extending pin comprising:
    (a) a contact body having a cylindrical portion at one end that terminates in a free axial end;
    (b) said cylindrical portion having an axial bore opening at said free end, a circumferential groove remote from said free end, and an axially extending slot located between said free end and said groove;
    (c) a unitary spring clip having a support base mounted in said groove and a cambered leg lying in said slot and extending toward said free end, said leg being curved in a plane passing adjacent the axis of said bore and extending into said bore toward said axis;
    (d) said support base being curved to mate with said groove and extending over more than 180° thereof to permit the clip to be snapped into said groove; and
    (e) a cylindrical sleeve means on the outside of said cylindrical portion for covering said slot and groove and retaining said leg in said slot.

2. An electrical socket contact according to claim 1, wherein said axial slot terminates short of the free end of said cylindrical portion defining a web, and said leg terminates short of the free end of said cylindrical portion in a free end that rests on said web, the portion of said leg between the free end thereof and the support base projecting into said bore.

3. An electrical socket contact according to claim 1 wherein the support base of said clip has a pair of curved fingers matching the curvature of said groove with said leg located centrally between the curved fingers.

4. An electrical socket contact according to claim 3 wherein said axial slot terminates within said groove to define a notch, and the junction between said curved fingers and said leg lies within said notch.

5. An electrical socket contact according to claim 4 wherein said web has a thickness that gradually decreases measured in a direction toward said groove whereby the free end of said leg rests on said web but does not project beyond the periphery of cylindrical portion for preloading said cambered leg, and wherein the thickness of said fingers is no greater than the depth of said groove whereby both the fingers and the junction between the fingers and said leg lie within the periphery of said cylindrical portion.

6. An electrical socket contact according to claim 5 wherein said sleeve is tubular with a uniform wall thickness and is slideably received on said cylindrical portion and crimped thereto at the end that is remote from the free end of said portion.

References Cited

UNITED STATES PATENTS

| 2,325,691 | 8/1943 | Litwin et al. | 339—256 |
| 3,078,439 | 2/1963 | McKee et al. | 339—217 |
| 3,140,141 | 7/1964 | Nava | 339—256 |
| 2,716,744 | 8/1955 | Swanson et al. | 339—255 |

FOREIGN PATENTS

| 196,173 | 1/1961 | Sweden. |
| 227,439 | 12/1958 | Australia. |

MARVIN A. CHAMPION, *Primary Examiner.*

R. S. STROBEL, *Assistant Examiner.*